United States Patent
Zhong et al.

(10) Patent No.: US 11,900,634 B2
(45) Date of Patent: Feb. 13, 2024

(54) METHOD FOR ADAPTIVELY DETECTING CHESSBOARD SUB-PIXEL LEVEL CORNER POINTS

(71) Applicants: DALIAN UNIVERSITY OF TECHNOLOGY, Liaoning (CN); PENG CHENG LABORATORY, Guangdong (CN)

(72) Inventors: Wei Zhong, Liaoning (CN); Deyun Lv, Liaoning (CN); Weiqiang Kong, Liaoning (CN); Risheng Liu, Liaoning (CN); Xin Fan, Liaoning (CN); Zhongxuan Luo, Liaoning (CN); Shengquan Li, Liaoning (CN)

(73) Assignees: DALIAN UNIVERSITY OF TECHNOLOGY, Liaoning (CN); PENG CHENG LABORATORY, Guangdong (CN)

( * ) Notice: Subject to any disclaimer, the term of this patent is extended or adjusted under 35 U.S.C. 154(b) by 370 days.

(21) Appl. No.: 17/604,185

(22) PCT Filed: Mar. 5, 2020

(86) PCT No.: PCT/CN2020/077959
§ 371 (c)(1),
(2) Date: Oct. 15, 2021

(87) PCT Pub. No.: WO2021/138990
PCT Pub. Date: Jul. 15, 2021

(65) Prior Publication Data
US 2022/0198712 A1    Jun. 23, 2022

(30) Foreign Application Priority Data
Jan. 10, 2020 (CN) .......................... 202010027812.0

(51) Int. Cl.
*G06T 7/80* (2017.01)
*H04N 17/00* (2006.01)
*G06V 10/75* (2022.01)

(52) U.S. Cl.
CPC ................ *G06T 7/80* (2017.01); *G06V 10/75* (2022.01); *H04N 17/002* (2013.01)

(58) Field of Classification Search
CPC ... G06T 7/80; G06T 2207/20164; G06T 7/73; G06T 2207/10004; G06V 10/75; H04N 17/002
See application file for complete search history.

(56) References Cited

U.S. PATENT DOCUMENTS

| | | | |
|---|---|---|---|
| 8,681,224 B2 * | 3/2014 | Mallon | G02B 27/0025 348/335 |
| 2012/0057053 A1 * | 3/2012 | Mallon | G01M 11/0264 348/E5.079 |

(Continued)

FOREIGN PATENT DOCUMENTS

| | | |
|---|---|---|
| CN | 104089575 A | 10/2014 |
| CN | 104240229 A | 12/2014 |
| CN | 108734743 A | 11/2018 |

OTHER PUBLICATIONS

L. Huang, L. He, J. Li and L. Yu, "A Checkerboard Corner Detection Method Using Circular Samplers, " 2018 IEEE 4th International Conference on Computer and Communications (ICCC), Chengdu, China, 2018, pp. 1546-1550, doi: 10.1109/CompComm.2018.8780757. (Year: 2018).*

(Continued)

*Primary Examiner* — Andrae S Allison
(74) *Attorney, Agent, or Firm* — MUNCY, GEISSLER, OLDS & LOWE, PC

(57) ABSTRACT

The present invention discloses a method for adaptively detecting chessboard sub-pixel level corner points. Adaptive (Continued)

detection of chessboard sub-pixel level corner points is completed by marking position of an initial unit grid on a chessboard, using a homography matrix H calculated by pixel coordinates of four corner points of the initial unit grid in a pixel coordinate system and world coordinates in a world coordinate system to expand outwards, adaptively adjusting size of an iteration window in the process of expanding outwards, and finally spreading to the whole chessboard region.

5 Claims, 2 Drawing Sheets

(56) References Cited

U.S. PATENT DOCUMENTS

| | | | |
|---|---|---|---|
| 2015/0077543 A1* | 3/2015 | Kerr | H04N 5/33 |
| | | | 348/135 |
| 2016/0371855 A1 | 12/2016 | Jovanovic et al. | |
| 2022/0148213 A1* | 5/2022 | Kong | G06V 10/143 |

OTHER PUBLICATIONS

Y. Zhang, G. Li, X. Xie and Z. Wang, "A new algorithm for accurate and automatic chessboard corner detection," 2017 IEEE International Symposium on Circuits and Systems (ISCAS), Baltimore, MD, USA, 2017, pp. 1-4, doi: 10.1109/ISCAS.2017.8050637. (Year: 2017).*

* cited by examiner

METHOD FOR ADAPTIVELY DETECTING CHESSBOARD SUB-PIXEL LEVEL CORNER POINTS

TECHNICAL FIELD

The present invention belongs to the field of image processing and computer vision, and particularly relates to a method for adaptively detecting chessboard sub-pixel level corner points.

BACKGROUND

As a kind of special corner points, chessboard corner points are widely used in camera calibration and play an important role. Chessboard patterns are widely used for camera calibration because of obvious contrast, simple features, and easy detection and recognition. At the same time, the calibration accuracy of internal and external parameters of a camera is directly determined by the accuracy of chessboard corner point detection, and the accuracy of subsequent image processing tasks is directly determined by the accuracy of the calibrated parameters of the camera. Therefore, improving the accuracy of corner point detection of chessboard images is an important topic in the field of vision measurement.

According to the implementation mode, the existing corner point detection methods are generally divided into three categories: methods based on gray intensity, methods based on edge contour, and methods based on corner point models. The methods based on gray intensity are mainly to detect corner points by checking the variance in local gray value of images; the methods based on edge contour are mainly to detect corner points by analyzing the edge shape characteristics of images; and the basic framework of the methods based on corner point models is to match and filter images by building different types of corner point parameterization models.

However, none of the above-mentioned methods can completely cover the whole angle of field of the camera with a chessboard image or extract feature points of edge area by the chessboard image, so that the calibrated internal and external parameters of the camera are certainly not accurate. At the same time, for a chessboard image shot in a complex illumination condition, the situations of chessboard corner point wrong detection and missing detection may occur. For a chessboard image with low resolution or large distortion, improper size of an iteration window for calculating sub-pixel level corner points will lead to wrong or unstable position detection of the sub-pixel level corner points.

SUMMARY

The present invention aims to overcome the defects of the existing chessboard corner point detection technology and proposes a method for adaptively detecting chessboard sub-pixel level corner points, i.e., detection of sub-pixel level corner points is completed by setting marks on a chessboard to mark position of an initial unit grid, determining pixel coordinates of four corner points of the initial unit grid, using a homography matrix H calculated by the pixel coordinates of the four corner points of the initial unit grid in a pixel coordinate system and manually set world coordinates in a world coordinate system to expand outwards, adaptively adjusting size of an iteration window in the process of expanding outwards, and finally spreading to the whole chessboard region.

The present invention has the following specific technical solution: a method for adaptively detecting chessboard sub-pixel level corner points, comprising the following steps:

1) Setting marks: setting marks on a chessboard to mark position of an initial unit grid;
2) Shooting an image: using a camera to collect an image of a chessboard calibration target, and conducting preliminary image processing;
3) Detecting the marks: detecting pixel coordinates of the marks set in step 1) by a mark detection algorithm;
4) Using the marks: calculating pixel coordinates of four corner points of the initial unit grid defined by the marks according to the pixel coordinates detected in step 3), calculating sub-pixel level corner point coordinates by iteration and conducting verification;
5) Expanding outwards: calculating a homography matrix H according to the sub-pixel level corner point coordinates of the four corner points in step 4) and world coordinates thereof in a world coordinate system; multiplying the homography matrix H with world coordinates of four corner points of an adjacent unit grid of the marked unit grid in the world coordinate system to calculate sub-pixel level corner point coordinates of the other two unknown corner points of the adjacent unit grid; and
6) Adaptively adjusting: counting side lengths of the adjacent unit grid obtained in the process of expanding outwards in step 5), and dynamically adjusting size of an iteration window for calculating sub-pixel level corner points to increase accuracy of sub-pixel level corner point detection.

Step 2) "shooting an image" comprises the following specific steps:

Conducting gray processing and binarization operation to the image after the image is shot; due to light and shadow, the effect directly using Otsu's method is not very ideal, so dividing an image I into M*N blocks by block binarization method, with each block named $I_i$; as and using Otsu's method for each $I_i$ to obtain a binarization image binary_I.

Step 4) comprises the following specific steps:

4-1) Calculating coordinates of four initial corner points of the unit grid defined by the marks in a pixel coordinate system according to geometrical relationship;

4-2) Letting a sub-pixel level corner point to be solved be q, then the line vector between surrounding points $p_i$ and q thereof is $(p_i\text{-}q)$; for any point $p_i$ in a search window thereof, letting the gray gradient at $p_i$ be $G_i$, then the following formula is obtained:

$$G_i^*(p_i-q)=0$$

Solving the formula by least square method:

$$G_i^T G_i q = G_i^T G_i p_i$$

i.e.:

$$q=(G_i^T G_i)^{-1}*(G_i^T G_i p_i)$$

The coordinate of an initial corner point is an integer and is assumed to be $q_0$, and a window is selected centering on $q_0$; the radius win of the iteration window of the sub-pixel level corner point is obtained; each point of the window is $p_i$; the quantity of $p_i$ is N, Gaussian weight is introduced, the weight at point $p_i$ is $w_i$, and the coordinate q of the sub-pixel level corner point is:

$$q = \sum_{i=0}^{N} (G_i^T G_i)^{-1} * (G_i^T G_i w_i p_i)$$

Using sobel convolution to calculate the gray gradient $G_i$ at point $p_i$; for point $p_i$:

$$G_i = [dx \quad dy]$$

$$G_i^T = \begin{bmatrix} dx \\ dy \end{bmatrix}$$

$$G_i^T G_i = \begin{bmatrix} dxdx & dxdy \\ dxdy & dydy \end{bmatrix};$$

4-3) Obtaining lengths of the four sides of the initially marked unit grid through the pixel coordinates of the four corner points of the unit grid defined by the marks, naming the lengths of the four sides in the same direction (clockwise or counterclockwise) as $d_1$, $d_2$, $d_3$, $d_4$ and the corresponding included angles of every two adjacent sides as $\theta_1$, $\theta_2$, $\theta_3$, $\theta_4$ respectively; when the average value $\bar{d}$ of the four side lengths of the unit grid and the radius win of the iteration window satisfy the following fitting relation:

$$\text{win} = \left[ \frac{k * \bar{d} + c}{p * \Sigma_{i=1}^{4} \frac{\left|\theta_i - \frac{\pi}{2}\right|}{4} + b} \right]$$

the sub-pixel level corner point detected is the most accurate, wherein k and p are coefficients of first order terms, and c and b are constants; based on the known k, ρ, c, b, $\bar{d}$ and $\theta_i$, the initial value of the radius win of the window is taken as $w_0$;

4-4) Verifying the four sub-pixel level corner point coordinates; naming the lengths of the four sides of the unit grid in the same direction (clockwise or counterclockwise) as $d'_1$, $d'_2$, $d'_3$, $d'_4$, the tangents of the four sides as $\phi_1$, $\phi_2$, $\phi_3$, $\phi_4$, and the corresponding included angles of every two adjacent sides as $\theta'_1$, $\theta'_2$, $\theta'_3$, $\theta'_4$ respectively; setting parameters $\mu_1$, $\mu_2$, $\lambda_1$, $\lambda_2$, $\eta_1$, $\eta_2$, $\delta_1$ and $\delta_2$, and taking $\mu_1 = \lambda_1 = \eta_1 = \delta_1 = 0.9$ and $\mu_2 = \lambda_2 = \eta_2 = \delta_2 = 1.1$; the side lengths needs to satisfy that:

$$\mu_1 \leq \frac{d'_1}{d'_3} \leq \mu_2, \lambda_1 \leq \frac{d'_2}{d'_4} \leq \lambda_2, \eta_1 \leq \frac{\phi_1}{\phi_3} \leq \eta_2 \text{ and } \delta_1 \leq \frac{\phi_2}{\phi_4} \leq \delta_2;$$

if the above relations are not satisfied, the size of the iteration window win for calculating sub-pixel level corner points shall be dynamically adjusted until the relations are satisfied.

Step 5) comprises the following specific steps:

5-1) Using the coordinates $P_1$, $P_2$, $P_3$ and $P_4$ of the four initial corner points of the initially marked unit grid; according to the imaging principle of the camera, the pixel coordinate of a projection point P in the pixel coordinate system of a point $W(X_w, Y_w, Z_w)$ in the world coordinate system is (u, v), i.e.:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 1 \end{bmatrix}$$

$$\begin{bmatrix} X_w \\ Y_w \\ Z_w \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix}$$

wherein $Z_c$ is the Z-coordinate of point W in a camera coordinate system, $u_0$ is the center coordinate of the image in x direction, $v_0$ is the center coordinate of the image in y direction, f is a focal length, R is a rotation matrix, T is a translation vector, $f_x$ is a scale factor on u axis, $f_y$ is a scale factor on v axis, dx is a pixel size in x direction, and dy is a pixel size in y direction;

5-2) Recording Z=0 of a point in the plane of the chessboard calibration target, so:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} [r_1 \quad r_2 \quad r_3 \quad t]$$

$$\begin{bmatrix} X_w \\ Y_w \\ 0 \\ 1 \end{bmatrix} = \begin{bmatrix} f_x & 0 & u_0 & 0 \\ 0 & f_y & v_0 & 0 \\ 0 & 0 & 1 & 0 \end{bmatrix} [r_1 \quad r_2 \quad t] \begin{bmatrix} X_w \\ Y_w \\ 1 \end{bmatrix}$$

wherein $r_1$, $r_2$ and $r_3$ are three column vectors of the rotation matrix R respectively, and t is a translation vector in x and y directions;

Based on that $Z_c P' = HW'$, letting $$A = \begin{bmatrix} f_x & 0 & u_0 & 0 \\ 0 & f_y & v_0 & 0 \\ 0 & 0 & 1 & 0 \end{bmatrix},$$

then the homography matrix H is obtained:

$$H = A[r_1 r_2 t]$$

Step 6) comprises the following specific steps:

6-1) In the process of expanding outwards, obtaining the coordinates of the other two unknown corner points of the adjacent unit grid according to the homography matrix H, obtaining the lengths of the four sides of the adjacent unit grid according to the coordinates of the two corner points, naming the lengths of the four sides in the same direction (clockwise or counterclockwise) as $d_1$, $d_2$, $d_3$, $d_4$ and the corresponding included angles of every two adjacent sides as $\theta_1$, $\theta_2$, $\theta_3$, $\theta_4$ respectively; when the average value $\bar{d}$ of the four side lengths of the unit grid and the radius win of the iteration window satisfy the following fitting relation:

$$\text{win} = \left[ \frac{k * \bar{d} + c}{\rho * \sum_{i=1}^{4} \frac{\left|\theta_i - \frac{\pi}{2}\right|}{4} + b} \right]$$

the sub-pixel level corner point detected is the most accurate, wherein k and ρ are coefficients of first order teams, and c and b are constants; based on the known k, ρ, c, b, $\bar{d}$ and $\theta_i$, the initial value of the radius win of the window is taken as $w_0$;

6-2) Verifying the accuracy of the sub-pixel level corner point coordinates of the four points of the adjacent unit grid; naming the lengths of the four sides of the adjacent unit grid in the same direction (clockwise or counterclockwise) as $d'_1$, $d'_2$, $d'_3$, $d'_4$, the tangents of the four sides as $\phi_1$, $\phi_2$, $\phi_3$, $\phi_4$, and the corresponding included angles of every two adjacent sides as $\theta'_1$, $\theta'_2$, $\theta'_3$, $\theta'_4$ respectively; setting parameters $\mu_1$, $\mu_2$, $\lambda_1$, $\lambda_2$, $\eta_1$, $\eta_2$, $\delta_1$ and $\delta_2$, and taking $\mu_1=\lambda_1=\eta_1=\delta_1=0.9$ and $\mu_2=\lambda_2=\eta_2=\delta_2=1.1$; the side lengths needs to satisfy that:

$$\mu_1 \le \frac{d'_1}{d'_3} \le \mu_2, \lambda_1 \le \frac{d'_2}{d'_4} \le \lambda_2, \eta_1 \le \frac{\phi_1}{\phi_3} \le \eta_2 \text{ and } \delta_1 \le \frac{\phi_2}{\phi_4} \le \delta_2;$$

if the above relations are not satisfied, the size of the iteration window win for calculating sub-pixel level corner points shall be dynamically adjusted until the relations are satisfied.

The present invention has the following beneficial effects: the present invention proposes a method for adaptively detecting chessboard corner points, having the following characteristics:

1. Simple procedure and easy implementation;
2. For a chessboard image with low resolution or large distortion, the size of the iteration window of sub-pixel level corner points can be dynamically adjusted, so that error rate of sub-pixel level corner point detection is reduced;
3. Corner point detection speed is high and will not be influenced by incompleteness of the chessboard, and a collected image only need to carry manually set marks; and
4. The whole angle of field of a camera can be completely covered with the chessboard image, and feature points of edge area can be extracted, so that the calibrated internal and external parameters of the camera are more accurate.

DETAILED DESCRIPTION

The present invention proposes a method for adaptively detecting chessboard sub-pixel level corner points, which realizes adaptive detection of chessboard sub-pixel level corner points by six steps, i.e., setting marks, shooting an image, detecting the marks, using the marks, expanding outwards and adaptively adjusting. The present invention will be described in detail below in combination with drawings and embodiments by taking the example of setting five circles on a chessboard as marks.

Figure 1:
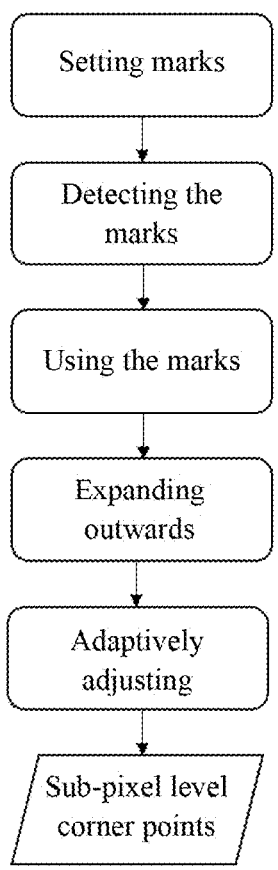
FIG. 1 is an overall flow chart of a solution.
Figure 2:
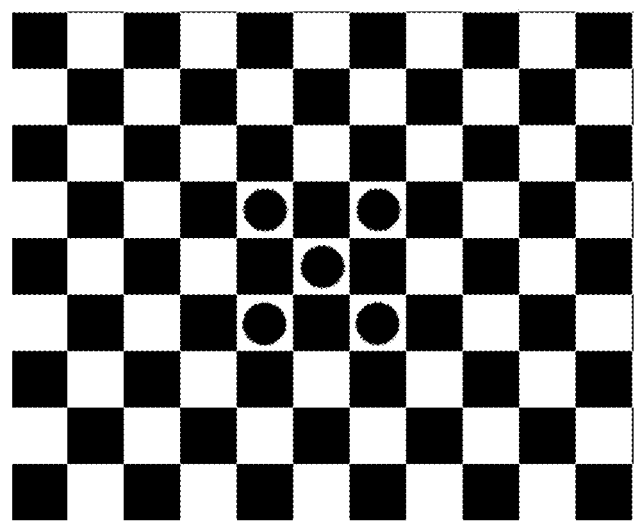
FIG. 2 is a chessboard marking diagram of an embodiment.
Figure 3:
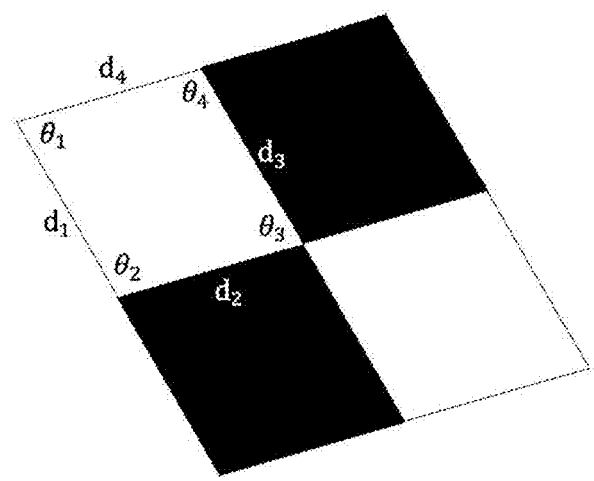
FIG. 3 is a schematic diagram of adaptive detection of sub-pixel level corner points in an embodiment.
Figure 4:
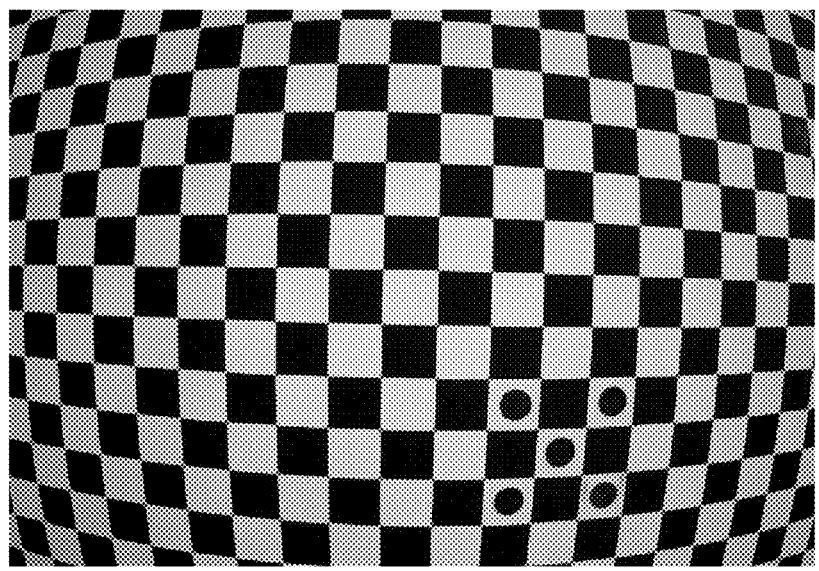
FIG. 4 shows results of adaptive detection of sub-pixel level corner points.
Figure 5:
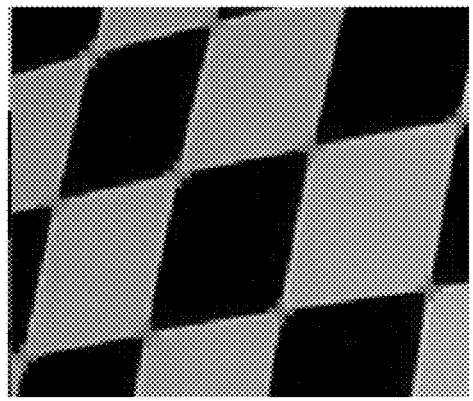
FIG. 5 shows details of corner point detection.

1) First, a printed chessboard is required, and a calibration target can be a chessboard with five circles or a common chessboard calibration target pasted with five circles as markers. As shown in FIG. 2, the positions of the five circles are distributed in the five white unit grids of 3*3 chessboard grids in the central region of black and white chessboard, the diameters of the five circles are smaller than the side lengths of the white unit grids, the serial number of the central circle is recorded as $C_0$, and the serial numbers of the rest four circles are recorded as $C_1$, $C_2$, $C_3$ and $C_4$.

2) The chessboard is shot by a camera until the black and white chessboard can completely cover the whole angle of field of the camera, and gray processing and binarization are respectively conducted to a collected image.

3) Taking an image I as an example, five circles in the image are detected by Hough circle detection algorithm, and pixel coordinates of the five circles are recorded. Middle points of four lines connecting the four peripheral circles $C_1$, $C_2$, $C_3$ and $C_4$ to the central circle $C_0$ are calculated and numbered as $P_1$, $P_2$, $P_3$ and $P_4$, and the four points are used as four initial corner points. It is assumed that the side lengths of $P_1P_2$, $P_2P_3$, $P_3P_4$, $P_4P_1$ are respectively $d_1$, $d_2$, $d_3$, $d_4$, and the corresponding included angles of every two sides are respectively $\theta_1$, $\theta_2$, $\theta_3$, $\theta_4$. According to empirical formulas obtained from previous observation, when the average value $\bar{d}$ of the four side lengths of the unit grid and the radius win of the iteration window satisfy the following fitting relation:

$$win = \left\lceil \frac{k*\bar{d}+c}{\rho * \sum_{i=1}^{4} \frac{\left|\theta_i - \frac{\pi}{2}\right|}{4} + b} \right\rceil$$

the sub-pixel level corner point detected is the most accurate, wherein k and ρ are coefficients of first order terms, and c and b are constants. Based on the known k, ρ, c, b, $\bar{d}$ and $\theta_i$, the initial value of the radius win of the window is taken as $w_0=7$ in the embodiment.

4) After sub-pixel level corner point coordinates of the four points are calculated by iteration, the accuracy of the sub-pixel level corner point coordinates calculated need to be verified. The lengths of the four sides of the unit grid are named in the same direction (clockwise or counterclockwise) as $d'_1$, $d'_2$, $d'_3$, $d'_4$, the tangents of the four sides are named as $\phi_1$, $\phi_2$, $\phi_3$, $\phi_4$, and the corresponding included angles of every two adjacent sides are named as $\theta'_1$, $\theta'_2$, $\theta'_3$, $\theta'_4$ respectively. Parameters $\mu_1$, $\mu_2$, $\lambda_1$, $\lambda_2$, $\eta_1$, $\eta_2$, $\delta_1$ and $\delta_2$ are set, and $\mu_1=\lambda_1=\eta_1=\delta_1=0.9$ and $\mu_2=\lambda_2=\eta_2=\delta_2=1.1$; are taken. The side lengths needs to satisfy that:

$$\mu_1 \le \frac{d'_1}{d'_3} \le \mu_2, \lambda_1 \le \frac{d'_2}{d'_4} \le \lambda_2, \eta_1 \le \frac{\phi_1}{\phi_3} \le \eta_2 \text{ and } \delta_1 \le \frac{\phi_2}{\phi_4} \le \delta_2.$$

If the above relations are not satisfied, the size of the iteration window win for calculating sub-pixel level corner points shall be dynamically adjusted until the relations are satisfied. Four sub-pixel level corner points $P_1$, $P_2$, $P_3$ and $P_4$ are solved by iteration according to the solving principle of sub-pixel level corner points.

4) The points on the chessboard are assigned with values one by one in a world coordinate system according to the four initial sub-pixel level corner points. A homography matrix H can be obtained by the relationship between the four points in the world coordinate system and those in a pixel coordinate system.

5) By using the homography matrix H of the initial four points and the coordinates of a pair of points $P_5$ and $P_6$ to be solved of an adjacent unit grid in the world coordinate system, pixel coordinates of next two points $P_5$ and $P_6$ can be obtained, and then new sub-pixel level corner points $P_5$ and $P_6$ are solved by iteration according to the solving principle of sub-pixel level corner points.

6) All sub-pixel level corner points on the chessboard are calculated by expanding and spreading outwards from the unit grid defined by the four points to the positive half axis of the X axis, the negative half axis of X axis, the positive half axis of the Y axis, and the negative half axis of Y axis.

7) In the process of expanding outwards, the other two unknown rough sub-pixel level corner points of the adjacent unit grid can be obtained according to the homography matrix H, the rough lengths of the four sides of the adjacent unit grid can be obtained according to the coordinates of the two rough corner points, the lengths of the four sides are named in the same direction (clockwise or counterclockwise) as $d_1, d_2, d_3, d_4$, and the corresponding included angles of every two adjacent sides are named as $\theta_1, \theta_2, \theta_3, \theta_4$ respectively. According to empirical formulas obtained from previous observation, when the average value $\bar{d}$ of the four side lengths of the unit grid and the radius win of the iteration window satisfy the following fitting relation:

$$win = \left[ \frac{k * \bar{d} + c}{\rho * \sum_{i=1}^{4} \frac{|\theta_i - \frac{\pi}{2}|}{4} + b} \right]$$

the sub-pixel level corner point detected is the most accurate, wherein k and ρ are coefficients of first order terms, and c and b are constants. Based on the known k, ρ, c, b, $\bar{d}$ and $\theta_i$, the initial value of the radius win of the window is taken as $w_0=5$.

8) After sub-pixel level corner point coordinates of the four points are calculated by iteration, the accuracy of the sub-pixel level corner point coordinates calculated need to be verified. The lengths of the four sides of the unit grid are named in the same direction (clockwise or counterclockwise) as $d'_1, d'_2, d'_3, d'_4$, the tangents of the four sides are named as $\phi_1, \phi_2, \phi_3, \phi_4$, and the corresponding included angles of every two adjacent sides are named as $\theta'_1, \theta'_2, \theta'_3, \theta'_4$ respectively. Parameters $\mu_1, \mu_2, \lambda_1, \lambda_2, \eta_1, \eta_2, \delta_1$ and $\delta_2$ are set, and $\mu_1=\lambda_1=\eta_1=\delta_1=0.9$ and $\mu_2=\lambda_2=\eta_2=\delta_2=1.1$ are taken. The side lengths needs to satisfy that:

$$\mu_1 \leq \frac{d'_1}{d'_3} \leq \mu_2, \lambda_1 \leq \frac{d'_2}{d'_4} \leq \lambda_2, \eta_1 \leq \frac{\phi_1}{\phi_3} \leq \eta_2 \text{ and } \delta_1 \leq \frac{\phi_2}{\phi_4} \leq \delta_2.$$

If the above relations are not satisfied, the size of the iteration window win for calculating sub-pixel level corner points shall be dynamically adjusted until the relations are satisfied.

The invention claimed is:

1. A method for adaptively detecting chessboard sub-pixel level corner points, comprising the following steps:
  1) setting marks: setting marks on a chessboard to mark position of an initial unit grid;
  2) shooting an image: using a camera to collect an image of a chessboard calibration target, and conducting preliminary image processing;
  3) detecting the marks: detecting pixel coordinates of the marks set in step 1) by a mark detection algorithm;
  4) using the marks: calculating pixel coordinates of four corner points of the initial unit grid defined by the marks according to the pixel coordinates detected in step 3), calculating sub-pixel level corner point coordinates by iteration and conducting verification;
  5) expanding outwards: calculating a homography matrix H according to the sub-pixel level corner point coordinates of the four corner points in step 4) and world coordinates thereof in a world coordinate system; multiplying the homography matrix H with world coordinates of four corner points of an adjacent unit grid of the marked unit grid in the world coordinate system to calculate sub-pixel level corner point coordinates of the other two unknown corner points of the adjacent unit grid;
  6) adaptively adjusting: counting side lengths of the adjacent unit grid obtained in the process of expanding outwards in step 5), and dynamically adjusting size of an iteration window for calculating sub-pixel level corner points to increase accuracy of sub-pixel level corner point detection.

2. The method for adaptively detecting chessboard sub-pixel level corner points according to claim 1, wherein step 2) comprises the following specific steps:
  conducting gray processing and binarization operation to the image after the image is shot; dividing an image I into M*N blocks by block binarization method, with each block named as $I_i$; and using Otsu's method for each $I_i$ to obtain a binarization image binary_I.

3. The method for adaptively detecting chessboard sub-pixel level corner points according to claim 2, wherein step 4) comprises the following specific steps:
  4-1) calculating coordinates of four initial corner points of the unit grid defined by the marks in a pixel coordinate system according to geometrical relationship;
  4-2) letting a sub-pixel level corner point to be solved be q, then the line vector between surrounding points $p_i$ and q thereof is $(p_i-q)$; for any point $p_i$ in a search window thereof, letting the gray gradient at $p_i$ be $G_i$, then the following formula is obtained:

$G_i*(p_i-q)=0$ solving the formula by least square method:

$G_i^T G_i q = G_i^T G_i p_i$ i.e.:

$q=(G_i^T G_i)^{-1}*(G_i^T G_i p_i)$ the coordinate of an initial corner point is an integer and is assumed to be $q_0$, and a window is selected centering on $q_0$; the radius win of the iteration window of the sub-pixel level corner point is obtained; each point of the window is $p_i$; the quantity of $p_i$ is N, Gaussian weight is introduced, the weight at point $p_i$ is $w_i$, and the coordinate q of the sub-pixel level corner point is:

$$q = \sum_{i=0}^{N} (G_i^T G_i)^{-1} * (G_i^T G_i w_i p_i)$$

using sobel convolution to calculate the gray gradient $G_i$ at point $p_i$; for point $p_i$:

$$G_i = [dx \quad dy]$$

$$G_i^T = \begin{bmatrix} dx \\ dy \end{bmatrix}$$

$$G_i^T G_i = \begin{bmatrix} dxdx & dxdy \\ dxdy & dydy \end{bmatrix};$$

4-3) obtaining lengths of the four sides of the initially marked unit grid through the pixel coordinates of the four corner points of the unit grid defined by the marks, naming the lengths of the four sides in the same direction (clockwise or counterclockwise) as $d_1, d_2, d_3, d_4$ and the corresponding included angles of every two adjacent sides as $\theta_1, \theta_2, \theta_3, \theta_4$ respectively; when the average value $\bar{d}$ of the four side lengths of the unit grid and the radius win of the iteration window satisfy the following fitting relation:

$$\text{win} = \left[ \frac{k*\bar{d}+c}{\rho * \sum_{i=1}^{4} \frac{|\theta_i - \frac{\pi}{2}|}{4} + b} \right]$$

the sub-pixel level corner point detected is the most accurate, wherein k and $\rho$ are coefficients of first order terms, and c and b are constants; based on the known k, $\rho$, c, b $\bar{d}$ and $\theta_i$, the initial value of the radius win of the window is taken as $w_0$;

4-4) verifying the four sub-pixel level corner point coordinates; naming the lengths of the four sides of the unit grid in the same direction (clockwise or counterclockwise) as $d'_1, d'_2, d'_3, d'_4$, the tangents of the four sides as $\phi_1, \phi_2, \phi_3, \phi_4$, and the corresponding included angles of every two adjacent sides as $\theta'_1, \theta'_2, \theta'_3, \theta'_4$ respectively; setting parameters $\mu_1, \mu_2, \lambda_1, \lambda_2, \eta_1, \eta_2, \delta_1$ and $\delta_2$, and taking $\mu_1=\lambda_1=\eta_1=\delta_1=0.9$ and $\mu_2=\lambda_2=\eta_2=\delta_2=1.1$; the side lengths needs to satisfy that:

$$\mu_1 \leq \frac{d'_1}{d'_3} \leq \mu_2, \lambda_1 \leq \frac{d'_2}{d'_4} \leq \lambda_2, \eta_1 \leq \frac{\phi_1}{\phi_3} \leq \eta_2 \text{ and } \delta_1 \leq \frac{\phi_2}{\phi_4} \leq \delta_2;$$

if the above relations are not satisfied, the size of the iteration window win for calculating sub-pixel level corner points shall be dynamically adjusted until the relations are satisfied.

4. The method for adaptively detecting chessboard sub-pixel level corner points according to claim 1, wherein step 5) comprises the following specific steps:

5-1) using the coordinates $P_1, P_2, P_3$ and $P_4$ of the four initial corner points of the initially marked unit grid; according to the imaging principle of the camera, the pixel coordinate of a projection point P in the pixel coordinate system of a point $W(X_w, Y_w, Z_w)$ in the world coordinate system is (u, v), i.e.:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix} =$$

$$\begin{bmatrix} f_x & 0 & u_0 & 0 \\ 0 & f_y & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix}$$

wherein $Z_c$ is the Z-coordinate of point W in a camera coordinate system, $u_0$ is the center coordinate of the image in x direction, $v_0$, is the center coordinate of the image in y direction, f is a focal length, R is a rotation matrix, T is a translation vector, $f_x$ is a scale factor on u axis, $f_y$ is a scale factor on v axis, dx is a pixel size in x direction, and dy is a pixel size in y direction;

5-2) recording Z=0 of a point in the plane of the chessboard calibration target, so:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} [r_1 \quad r_2 \quad r_3 \quad t] \begin{bmatrix} X_w \\ Y_w \\ 0 \\ 1 \end{bmatrix} =$$

$$\begin{bmatrix} f_x & 0 & u_0 & 0 \\ 0 & f_y & v_0 & 0 \\ 0 & 0 & 1 & 0 \end{bmatrix} [r_1 \quad r_2 \quad t] \begin{bmatrix} X_w \\ Y_w \\ 1 \end{bmatrix}$$

wherein $r_1, r_2$ and $r_3$ are three column vectors of the rotation matrix R respectively, and t is a translation vector in x and y directions;

based on that $Z_c P'=HW'$, letting $$A = \begin{bmatrix} f_x & 0 & u_0 & 0 \\ 0 & f_y & v_0 & 0 \\ 0 & 0 & 1 & 0 \end{bmatrix},$$

then the homography matrix H is obtained:

$H=A[r_1 r_2]$.

5. The method for adaptively detecting chessboard sub-pixel level corner points according to claim 4, wherein step 6) comprises the following specific steps:

6-1) in the process of expanding outwards, obtaining the coordinates of the other two unknown corner points of the adjacent unit grid according to the homography matrix H, obtaining the lengths of the four sides of the adjacent unit grid according to the coordinates of the two corner points, naming the lengths of the four sides in the same direction (clockwise or counterclockwise) as $d_1, d_2, d_3, d_4$ and the corresponding included angles of every two adjacent sides as $\theta_1, \theta_2, \theta_3, \theta_4$ respectively; when the average value $\bar{d}$ of the four side lengths of the unit grid and the radius win of the iteration window satisfy the following fitting relation:

$$\text{win} = \left[ \frac{k*\bar{d}+c}{\rho * \sum_{i=1}^{4} \frac{|\theta_i - \frac{\pi}{2}|}{4} + b} \right]$$

the sub-pixel level corner point detected is the most accurate, wherein k and ρ are coefficients of first order terms, and c and b are constants; based on the known k, ρ, c, b, $\bar{d}$ and $\theta_i$, the initial value of the radius win of the window is taken as $w_0$;

6-2) verifying the accuracy of the sub-pixel level corner point coordinates of the four points of the adjacent unit grid; naming the lengths of the four sides of the adjacent unit grid in the same direction (clockwise or counterclockwise) as $d'_1$, $d'_2$, $d'_3$, $d'_4$, the tangents of the four sides as $\phi_1$, $\phi_2$, $\phi_3$, $\phi_4$, and the corresponding included angles of every two adjacent sides as $\theta'_1$, $\theta'_2$, $\theta'_3$, $\theta'_4$ respectively; setting parameters $\mu_1$, $\mu_2$, $\lambda_1$, $\lambda_2$, $\eta_1$, $\eta_2$, $\delta_1$ and $\delta_2$, and taking $\mu_1=\lambda_1=\eta_1=\delta_1=0.9$ and $\mu_2=\lambda_2=\eta_2=\delta_2=1.1$; the side lengths needs to satisfy that:

$$\mu_1 \le \frac{d'_1}{d'_3} \le \mu_2,\ \lambda_1 \le \frac{d'_2}{d'_4} \le \lambda_2,\ \eta_1 \le \frac{\phi_1}{\phi_3} \le \eta_2 \text{ and } \delta_1 \le \frac{\phi_2}{\phi_4} \le \delta_2;$$

if the above relations are not satisfied, the size of the iteration window win for calculating sub-pixel level corner points shall be dynamically adjusted until the relations are satisfied.

* * * * *